United States Patent [19]
Gisser et al.

[11] 4,071,678
[45] Jan. 31, 1978

[54] RANDOM COPOLYMERS OF METHYL METHACRYLATE AND N-OCTADECYL METHACRYLATE

[75] Inventors: Henry Gisser; Seymour Portnoy, both of Philadelphia, Pa.

[73] Assignee: The United States of America as represented by the Secretary of the Army, Washington, D.C.

[21] Appl. No.: 681,677

[22] Filed: Apr. 29, 1976

[51] Int. Cl.$^2$ .................... C08F 220/14; C08F 220/16
[52] U.S. Cl. .................................... 526/328; 428/442; 428/463; 428/500
[58] Field of Search ......................................... 526/328

[56] References Cited

U.S. PATENT DOCUMENTS

| 3,194,777 | 7/1965 | Christenson et al. | 526/328 |
| 3,282,900 | 11/1966 | Chadha et al. | 526/328 |
| 3,856,685 | 12/1974 | Mori et al. | 526/328 |
| 3,869,396 | 3/1975 | Van de Kraats et al. | 526/328 |
| 3,951,929 | 4/1976 | Sweeney | 526/328 |
| 3,972,864 | 8/1976 | Gisser et al. | 526/328 |

OTHER PUBLICATIONS

Greenberg, et al., J. Am. Chem. Soc. 76, (Jan. 5, 1955), pp. 6280–6285.
Ailhand, et al., Die Makromoleculare Chemie, 140, (No. 3494), pp. 179–200, (1970).

*Primary Examiner*—Harry Wong, Jr.
*Attorney, Agent, or Firm*—Nathan Edelberg; Robert P. Gibson; Arthur I. Speckler

[57] ABSTRACT

Random copolymers are formed by reacting methyl methacrylate and n-octadecyl methacrylate (normal octadecyl methacrylate) at about 75°–80° C in the presence of catalytic amounts of benzoyl peroxide. The mole percentage of the monomer units containing the octadecyl group in the copolymers ranges from 7–21%, the mole percentage of the monomer units originating from methyl methacrylate ranging from 79–93%. The copolymers are useful as moldable lubricants which possess admirable toughness, low friction and low wear.

3 Claims, No Drawings

RANDOM COPOLYMERS OF METHYL METHACRYLATE AND N-OCTADECYL METHACRYLATE

The invention described herein may be manufactured, used and licensed by or for the Government for governmental purposes without the payment to us of any royalty thereon.

This invention relates generally to random copolymers useful as lubricants, and, more particularly to moldable, random copolymers formed from methyl methacrylate and n-octadecyl methacrylate.

There is a progressively increasing need for solid polymers having good wear properties, low friction, and toughness. Polytetrafluoroethylene, which has excellent low friction properties, is limited in its use as a solid moving part because of its poor wear resistance. Solid composite members, such as gears and bearings, for example, comprising polytetrafluoroethylene combined with certain metals possess low friction and low wear properties, but are expensive and may not have the required toughness. Similarly, polyamides such as poly(hexamethylene adipamide), poly(hexamethylene sebacamide), or poly (ω-amino-undecanoic acid) have been used as solid members because of their low wear. However, such polyamides generally do not provide the very low friction properties achieved by our compositions. Block copolymers of methyl methacrylate and n-octadecyl methacrylate are known as well as random copolymers containing between 37–69.5 mole % n-octadecyl methacrylate and about 73–30.5 mole % methyl methacrylate. The present invention, however, relates to the random copolymers of n-octadecyl methacrylate and methyl methacrylate wherein the mole percentage of the monomer units containing the octadecyl group in the copolymers ranges from 7–21%, the mole percentage of the monomer units originating from methyl methacrylate ranging from 79–93%. We have found that when the mole percentage of the monomer units containing the octadecyl group in the copolymer is above about 21%, the copolymer compositions would not be useful as low friction and wear materials due to excessive softness resulting in insufficient rigidity to be useful as a clad film or as solid material. When the mole % of the monomer units containing the octadecyl group in the copolymer falls below about 7%, poor friction and wear properties result. These optimum properties possessed by our range (7–21 mole % octadecyl) are not suggested by the aforementioned prior art.

It is thus an object of the present invention to provide a solid, rigid and moldable lubricant of low friction, good wear and good toughness.

It is a further object to provide such a low friction lubricant from readily available starting materials.

These and other objects may be more readily apparent from the following description.

In accordance with the present invention, methyl methacrylate and n-octadecyl methacrylate may be polymerized by free radical catalysts such as benzoyl peroxide and azobisisobutyronitrile at about 75°–80° C to form random copolymers. The n-octadecyl group is believed to furnish the low friction and wear properties to the resulting copolymers, while the monomer unit originating from methyl methacrylate is believed to provide the desired toughness. The number average molecular weights for our copolymers ranges from about 7,000 to about 20,100.

In the practice of our invention, our copolymer may be advantageously clad over a solid member, for example, of poly(hexamethylene adipamide) or methyl methacrylate of appropriate shape to form a gear or bearing. Methods of cladding include painting or dipping the solid member into a solution of our copolymer of which the solvent may be xylene. Another suitable method of cladding is extrusion whereby, for example, a sleeve composed of our copolymer may be fitted over a cylindrical solid member. The cylinder and enveloping sleeve may next be extruded through an opening of desired shape and size to form a cylindrical slider bearing. Or cladding may comprise rolling our copolymer onto a flat surface so as to impart the desired thickness and adherence thereto. Alternatively, our copolymer may be molded as a solid member.

Table I below cites molecular weights and molding temperatures of copolymers of methyl methacrylate and n-octadecyl methacrylate, the copolymers being molded into disks for later friction measurements.

TABLE I

Molecular Weights and Molding Temperatures of Copolymers of Methyl and n-Octadecyl Methacrylates

| Mole % of Monomer Units Containing the n-Octadecyl Group in the copolymer | Mol.wt.[a] | Molding Temp. ° C |
|---|---|---|
| 0 | $8.1 \times 10^5$ | 145 |
| 1 | 4250 | 145 |
| 7 | 20,100 | 150 |
| 21 | 7270 | 150 |
| 22 | c | b |
| 29 | 4500 | b |
| 100 | $22 \times 10^5$ | 145 |

[a]Number average molecular weight.
[b]too soft to be molded.
[c]Number average molecular weight not determined.

After being molded, the disks were permitted to cool under 3,000 psi to room temperature. The molded disks were then abraded successively with 400 and 600 silicon carbide paper in order to effect a reproduceable surface finish. After air driving, the disks were placed in a desiccator over anhydrous calcium sulfate for 24 hours before making friction measurements.

Friction measurements were also made on thin films of our copolymer deposited on glass and stainless steel. The films (approximately 3,500 Å thick) were deposited from a 0.1% solution of the copolymers in xylene. All friction measurements were made on a modified Bowden-Leben machine, and using a sliding speed of 0.04 cm/sec. Table II below presents the resulting friction data. The data indicate a decreasing coefficient of friction with increasing mole percentage of the monomer units containing the octadecyl group in the copolymers.

TABLE II

Coefficient of Friction of Copolymers of Methyl and n-Octadecyl Methacrylate

| Mole % of Monomer Units Containing the n-Octadecyl Group in the Copolymer | Coefficient of Friction | | |
|---|---|---|---|
| | Disk | Film on Glass | Film on Stainless Steel |
| 0 | 0.43 | 0.24 | 0.26 |
| 1 | 0.42 | 0.23 | 0.24 |
| 7 | 0.35 | 0.18 | 0.21 |
| 21 | 0.19 | 0.17 | 0.14 |

TABLE II-continued
Coefficient of Friction of Copolymers of Methyl and n-Octadecyl Methacrylate

| Mole % of Monomer Units Containing the n-Octadecyl Group in the Copolymer | Coefficient of Friction | | |
|---|---|---|---|
| | Disk | Film on Glass | Film on Stainless Steel |
| 22 | a | b | b |
| 29 | a | 0.13 | 0.11 |
| 100 | 0.08 | 0.12 | 0.08 |

[a]too soft to be molded.
[b]coefficient of friction not determined.

Thin films (approximately 3,000 A thick) of our copolymers were deposited from xylene solution upon steel substrates for durability tests. Their durability was determined with a Bowden-Leben machine by repeated traverses of a 440 C rider over a single track at a slider speed of 0.04 cm/sec under a 500 gm load. A rapid friction increase indicates failure of the film. The durability test indicated when the mole percentage of the monomer units, containing the octadecyl group in the copolymer was about 7 mole %, the film showed incipient film failure after about 50 traverses of the rider. However, when the percentage of the monomeric units containing the octadecyl group was increased to about 21 mole %, the film began to fail after about 145 traverses of the rider. At 100 mole % of the octadecyl monomeric units, film failure commenced after about 210 traverses of the rider. The durability test thus indicated an increase in durability with increasing percentage of the n-octadecyl group in the copolymers.

Our invention may be better understood by reference to the following method which describes the preparation of a copolymer in which the monomer units containing the octadecyl group comprises about 21 mole %, and the monomer units originating from methyl methacrylate comprises about 79 mole %.

The monomers, methyl methacrylate and n-octadecyl methacrylate were purified by washing each with 5% aqueous KOH solution followed by several further washings with distilled water in a separatory funnel until the resulting solution was neutral. The monomer layer in both cases was separated and dried over anhydrous sodium sulfate. After drying, each monomer was fractionally distilled. The fraction of methyl methacrylate, B.P. 99°–100° C at 760 mm pressure, and the fraction of n-octadecyl methacrylate, B.P. 179°–181° C at 15mm pressure, were utilized in the copolymerization reaction.

Next, a 50 ml flask, fitted with condenser and drying tube, thermometer, magnetic stirrer, and nitrogen-inlet tube, was first flushed with dry nitrogen. Into the flask was placed 10.2 grams (0.03 mole) of n-octadecyl methacrylate, 12.0 grams (0.12 mole) methyl methacrylate, and 111 mg. benzoyl peroxide. As nitrogen was bubbled through the reaction mixture, heat was then applied gradually so that the temperature of the reaction mixture rose approximately 1°–2° per minute. Upon reaching about 75°–80° C, there occurred a sudden, rapid increase in temperature to about 125° C. Heating was discontinued at this point. After cooling to room temperature, the reaction mixture was extracted with 125 cc of hot benzene. The resulting benzene solution was allowed to cool to room temperature and methanol was added until the solution just became cloudy. An additional 15 cc of methanol was then added. The solution was allowed to stand overnight and the crude polymer, now precipitated, was recovered by decanting the liquid. The crude copolymer was purified by again dissolving it in hot benzene followed by precipitation with methyl alcohol. Calculations from carbon content indicated a copolymer wherein the mole percentage of the monomer units therein containing the octadecyl group comprised about 21%, and the mole percentage of the monomer units therein originating from methyl methacrylate comprised about 79%.

We claim:

1. Random copolymers useful as a clad film or solid members such as gears, bearings, and the like, comprising the reaction products of the free radical bulk polymerization of n-octadecyl methacrylate and methyl methacrylate, said copolymers having a number average molecular weight ranging from about 7,000 to about 20,100, the mole percentage of the monomer units containing the octadecyl group in said copolymers ranging from about 7% to about 21%, the mole percentage of the monomer units in said copolymers originating from methyl methacrylate ranging from about 79% to about 93%, and said copolymers having coefficients of friction in the range between 0.35 and 0.19 when molded into disks under 3000 psi.

2. Random copolymers according to claim 1 wherein the mole percentage of the monomer units containing the octadecyl group in said copolymers is about 21%, and the mole percentage of the monomer units in said copolymers originating from methyl methacrylate is about 79%.

3. Random copolymers according to claim 1 wherein the mole percentage of the monomer units containing the octadecyl group in said copolymers is about 7%, the mole percentage of the monomer units in said copolymers originating from methyl methacrylate is about 93%.

* * * * *